(12) United States Patent
Boakye et al.

(10) Patent No.: US 6,221,942 B1
(45) Date of Patent: Apr. 24, 2001

(54) ZIRCON-CARBON FOR CERAMIC COMPOSITE FIBER COATINGS AND FINE-GRAINED ZIRCON POWDER

(75) Inventors: Emmanuel E. Boakye, Dayton; Randall S. Hay; Triplicane A. Parthasarathy, both of Beavercreek; M. Dennis Petry, New Paris, all of OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/378,946

(22) Filed: Aug. 23, 1999

(51) Int. Cl.⁷ .................................................. C08K 5/24
(52) U.S. Cl. ............................................. 524/261; 524/413
(58) Field of Search ..................... 252/363.5; 264/621; 524/261, 188, 413; 516/20, 23, 26

(56) References Cited

U.S. PATENT DOCUMENTS

| | | |
|---|---|---|
| 4,788,045 * | 11/1988 | Colombet et al. ................... 423/85 |
| 5,164,229 | 11/1992 | Hay et al. . |
| 5,217,533 | 6/1993 | Hay et al. . |
| 5,223,176 | 6/1993 | Obitsu et al. . |
| 5,238,625 | 8/1993 | Sakurai et al. . |
| 5,292,553 * | 3/1994 | Leture et al. ...................... 427/244 |
| 5,780,004 | 7/1998 | Balducci et al. . |
| 6,001,761 * | 12/1999 | Hata et al. ......................... 501/103 |

OTHER PUBLICATIONS

T. Osuka, H. Morikawa, F. Marumo, K. Yasumori, M. Yamane, "Changes in Zr Coordination Number During the Pyrolysis of a $SiO_2$–$ZrO_2$ Gel", Journal of Non–Crystalline Solids, 82(1986), 154–159 (Jun. 1, 1986).

* cited by examiner

Primary Examiner—Edward J. Cain
Assistant Examiner—Katarzyna Wyrozebski-Lee
(74) Attorney, Agent, or Firm—Charles E. Bricker; Thomas L. Kundert

(57) ABSTRACT

A carbon-rich zirconia-silica sol is prepared by the steps of dissolving zirconyl nitrate hydrate in absolute ethanol, mixing the solution thus obtained with a silicon alkoxide, and mixing the latter solution with a polyelectrolyte. The resulting carbon-rich sol/polyelectrolyte mixture can be employed to coat continuous fiber tow or filaments, to make nanosized zircon powder and to make a porous zircon membrane material.

4 Claims, No Drawings

ZIRCON-CARBON FOR CERAMIC COMPOSITE FIBER COATINGS AND FINE-GRAINED ZIRCON POWDER

RIGHTS OF THE GOVERNMENT

The invention described herein may be manufactured and used by or for the Government of the United States for all governmental purposes without the payment of any royalty.

BACKGROUND OF THE INVENTION

The present invention relates to a process for the preparation of mixed silica-zirconia sols and mixed oxides obtained therefrom.

Processes for the preparation of binary mixed oxides consisting of silica and a metal oxide, (for example $Al_2O_3$, $TiO_2$, $ZrO_2$ and MgO) are well known; however, little information is given as to the structural homogeneity of the materials and, in particular, the distribution of the metal element (Al, Ti, Zr, Mg) in the silica structure. It is known that the traditional coprecipitation techniques of silica with the hydroxide of the metal element do not lead to the formation of mixed oxides with a homogeneous structure, since the precipitation pH of the relative hydroxides are somewhat different. This generally results in the production of products whose surface composition, measured with a surface analysis method such as, for example XPS (X-ray photoelectron spectroscopy), is different from the mass composition. These analyses generally indicate a tendency of the Si to be present on the surface of the particles as compare to the metal element.

To overcome or minimize problems relating to the structural homogeneity of mixed oxides based on silica, various technological solutions have been proposed which basically consist in controlling the reactivity of the precursors of the Si and element used in the preparation of the material. For example, in the preparation of mixed oxides $SiO_2$—$ZrO_2$ starting from sodium silicate as the silicon precursor, compounds of Zr of the type $Na_4Zr(C_2O_4).nH_2O$ have been used to avoid the premature precipitation of the Zr. In other processes fluozirconic acid ($H_2ZrF_6$) has been used combined with fluosilicic acid ($H_2SiF_6$) to balance the reactivity of the Si and Zr precursors.

In processes for the preparation of binary mixed oxide sols based on $SiO_2$ starting from alkoxides of Si and the metal element, the method most frequently used consists in prehydrolizing the Si alkoxide with a controlled quantity of water; the hydroxylate precursor thus formed is subsequently interacted with the metal alkoxide. In other processes the higher reactivity of the metal alkoxide compared to that of the Si alkoxide, is slowed down with the use of complexing agents such as for example diketones as in the case of mixed oxides $SiO_2$—$TiO_2$.

The mixed oxide sols have been used to prepare glasses, e.g., $ZrO_2$-containing glasses, to prepare mixed oxides in particulate form, and to coat ceramic reinforcing fibers for incorporation into fiber reinforced ceramic matrix composites (CMC).

Ceramic matrix composites are flaw tolerant if the fiber coating promotes crack deflection and fiber pull-out at the fiber-matrix interface. Crack deflection requires that the interface material be weak relative to the fiber and the matrix. Ideally, fiber coatings should be smooth, of uniform thickness, have the correct composition and should not degrade filament tensile strength. Current CMC fiber-matrix interfaces are either carbon or boron nitride. However, oxidation is a major limitation to both these interfaces, particularly in the presence of water, and "pest" oxidation is a severe problem at intermediate temperatures. These problems have motivated research on oxide CMCs with replacements for C and BN that are stable at high temperatures.

Porous fiber-matrix interfaces are one candidate for an oxidation resistant interface. The inherent weakness of porous materials with respect to dense materials of the same phase is known. A fugitive phase, such as carbon, is required to hold the porosity open during matrix processing. After a dense matrix is introduced, the fugitive phase can be burned out. Zircon is a viable candidate for a porous interface. It is stable with common structural ceramics such as SiC, $Si_3N_4$, $Al_2O_3$, and mullite. It has a thermal expansion coefficient that closely matches SiC and $Si_3N_4$. It also has an inherent resistance to sintering and coarsening because of low diffusion coefficients.

Accordingly, it is an object of the present invention to provide an improved carbon-rich zirconia-silica sol.

Other objects, aspects and advantages of the present invention will be apparent to those skilled in the art from a reading of the following detailed disclosure of the invention.

SUMMARY OF THE INVENTION

In accordance with the present invention there is provided a method for making a carbon-rich zirconia-silica sol. In one aspect, the carbon-rich zirconia-silica sol is used to coat a reinforcing fiber or fiber tow. In another aspect, the carbon-rich zirconia-silica sol is used to make a porous membrane. In yet another aspect, the carbon-rich zirconia-silica sol is used to make zircon powder.

The process for the preparation of the carbon-rich zirconia-silica sol of the present invention comprises the steps of:

(a) dissolving the zirconyl nitrate hydrate in absolute ethanol;

(b) mixing the solution thus obtained with a silicon alkoxide; and (c) mixing the solution thus obtained in step (b) with a polyelectrolyte.

Dissolution of the zirconyl nitrate hydrate in absolute ethanol may be aided by heating the mixture to reflux for a brief time, e.g., for about 30 minutes. The silicon alkoxide, preferably tetraethoxysilicon (TEOS), is added to the ethanol/salt solution and the resulting mixture is heated to reflux, with stirring, for about 12–36 hours.

In one aspect, the process of the present invention relies on the water of hydration of the zirconyl nitrate as the major water source for hydrolysis of the zircon gel precursor, thus obviating the need to hydrolyze the precursor. In another aspect, however, the silicon alkoxide can be prehydrolized, for example, for 2 hours at pH 2, with an ethanol:silicon alkoxide molar ratio of 5.8:1 and a water:silicon alkoxide molar ratio of 10:1.

In either embodiment, i.e., without or with prehydrolysis of the silicon alkoxide, it is presently preferred to add a small quantity, about 0.70 to 2.0 g/l, of ammonium vanadate or copper nitrate hydrate to the sol to decrease the zircon formation temperature.

The thus-prepared zircon sol is then mixed with a polyelectrolyte. Suitable polyelectrolytes include polyacrylic acid, ammonium polyacrylate, ammonium polymethacrylate, and mixtures of citric acid or 2,4-pentanedione with ethylene glycol (1:1 molar). The weight ratio of zircon:polyelectrolyte can vary between 20:80 and 80:20.

The resulting carbon-rich sol/polyelectrolyte mixture can be employed in a concentration of about 4 to 170 g/l to coat continuous fiber tow or filaments using the apparatus and method disclosed by Hay et al, U.S. Pat. No. 5,164,229, issued Nov. 17,1992, Hay et al, U.S. Pat. No. 5,217,533, issued Jun. 8, 1993 and Hay et al, U.S. patent application Ser. No. 08/935,311; filed May 19,1998, all of which are incorporated by reference herein.

Fiber tow or filament coated with the carbon-rich sol/polyelectrolyte mixture is first heated to evaporate the alcohol, then cured in an inert atmosphere, e.g., neon or argon, at a temperature of about 900–1200° C., to provide tow or filament coated with zircon dispersed in carbon.

The cured, coated fiber tow or filament can be incorporated into a ceramic composite, for example, by infiltrating a plurality of coated fiber tow or filament with a matrix precursor material such as Blackglas™, available from Allied Signal, Inc., Des Plains, Ill., then curing the matrix precursor to provide the composite. Other techniques for fabricating fiber-reinforced ceramic composite structures are well known in the art. Following incorporation of the coated fiber tow or filament into a ceramic composite, the carbon can be burned out by heating the composite in an oxygen atmosphere at a temperature of about 600–1000° C., to yield a composite having a porous zircon fiber-matrix interface. The porosity of the fiber-matrix interface can be adjusted by adjusting the zircon:polyelectrolyte ratio to give optimal mechanical properties for crack deflection and fiber pullout at the interface.

The sol/polyelectrolyte mixture can also be employed to make nanosized zircon powder. Nanosized zircon powder dispersed in carbon can be prepared by (a) evaporating the sol/polyelectrolyte mixture at about 140° C. to provide a zircon-carbon precursor, then (b) heat treating the zircon-carbon precursor in an inert atmosphere, e.g., neon or argon, at a temperature of about 900–1200° C. to provide zirconia-silica powder dispersed in carbon. Nanosized zircon powder can be obtained from the latter by heat treatment in air at about 900–1200° C.

Nanosized zircon powder dispersed in carbon can also be prepared by (a) evaporating the sol/polyelectrolyte mixture at about 140° C. to provide a zircon-carbon precursor, (b) heat treating the zircon-carbon precursor in air at about 300–400° C., then (c) heat treating the material from step (b) in an inert atmosphere, e.g., neon or argon, at a temperature of about 1200–1400° C. to provide zircon-carbon powder. Nanosized zircon powder can be obtained from the latter by (d) heat treatment in air at about 900–1200° C.

The sol/polyelectrolyte mixture can further be employed to make a porous zircon membrane material by the steps of (a) coating the sol/polyelectrolyte mixture onto a suitable substrate, (b) drying the coated substrate in air at 140° C., (c) heat treating the coated substrate in an inert atmosphere, e.g., neon or argon, at a temperature of about 900–1200° C. to provide zirconia-silica powder dispersed in carbon, and (d) heat treating the product from step (c) in air at about 900–1200° C. to provide the porous zircon membrane material. Suitable substrate materials, as well as coating thickness, will be known to those skilled in the art.

The porous zircon membrane material can also be prepared by the steps of (a) coating the sol/polyelectrolyte mixture onto a suitable substrate, (b) drying the coated substrate in air at 140° C., (c) heat treating the dried, coated substrate in air at about 300–400° C., (d) heat treating the material from step (c) in an inert atmosphere, e.g., neon or argon, at a temperature of about 1200–1400° C. to provide a coating of zircon dispersed in carbon, and (e) heat treating the product from step (d) in air at about 900–1200° C. to provide the porous zircon membrane material. Suitable substrate materials, as well as coating thickness, will be known to those skilled in the art.

It is also within the scope of the present invention to vary the Zr:Si molar ratio in order to obtain a mixture of zircon and silica.

The following examples illustrate the invention:

EXAMPLE I

Zirconyl nitrate hydrate (25 g, 0.108 mole) was mixed with 500 ml absolute ethanol and the mixture refluxed at 45° C. for 30 minutes. Tetraethoxysilicon (2:2.5 g, 0.108 mole), was added and the resulting mixture was refluxed at 55° C. for 24 hours. The mixture was doped with 0.63 g ammonium vanadate or 0.4 g copper nitrate hydrate to decrease the zircon formation temperature. Polyacrylic acid was added to the zircon sol in a weight ratio of 40:60 (zircon:polyacrylic acid). Viscosities of 1.26, 2.44 and 5.32 cP were measured for concentrations of 40, 80 and 160 g/l, respectively.

EXAMPLE II

The sol of Example I was used to coat a variety of fiber tow, including silicon carbide and silicon carbide containing titanium, using a continuous coating apparatus. The coatings were cured in-line in an argon atmosphere. A sol concentration of 60 g/l provided a median coating thickness of 50 nm. The coating was homogeneous with a zirconia-silica grain size of 5–10 nm and a carbon particle size of 5–15 nm. Filaments cured at 1000° and 1100° C. had strengths of 1.96 and 1.88 GPA, respectively. The virgin filament strength was 2 GPA. Mini-composites were fabricated with the coated tow. The tow was infiltrated with a polysiloxane polymer (Blackglas™), then heat treated at 925° C.

EXAMPLE III

Zircon powder is prepared from the sol of Example I by evaporating the sol at 140° C., then heat treating the resulting powder in argon at 1000° C. to form nanosized zirconia-silica dispersed in carbon. The latter is heat treated in air at 1000° C. to form nanosized zircon.

Various modifications may be made to the invention as described without departing from the spirit of the invention or the scope of the appended claims.

We claim:

1. A process for the preparation of a carbon-rich zirconia-silica sol comprising the steps of:
    (a) dissolving zirconyl nitrate hydrate in absolute ethanol;
    (b) mixing the solution thus obtained in step (a) with a silicon alkoxide; and
    (c) mixing the solution thus obtained in step (b) with a polyelectrolyte.

2. The process of claim 1 wherein about 0.70 to 2.0 g/l of ammonium vanadate or copper nitrate hydrate is added to the sol in step (b) to decrease the zircon formation temperature.

3. The process of claim 1 wherein said polyelectrolyte is selected from the group consisting of polyacrylic acid, ammonium polyacrylate, ammonium polymethacrylate, a mixture of citric acid with ethylene glycol and a mixture of 2,4-pentanedione with ethylene glycol.

4. The process of claim 1 wherein the weight ratio of zircon:polyelectrolyte is about is 20:80 to 80:20.

* * * * *